H. BARBER.
TRAP.
APPLICATION FILED JAN. 24, 1908.
919,116.
Patented Apr. 20, 1909.
2 SHEETS—SHEET 1.
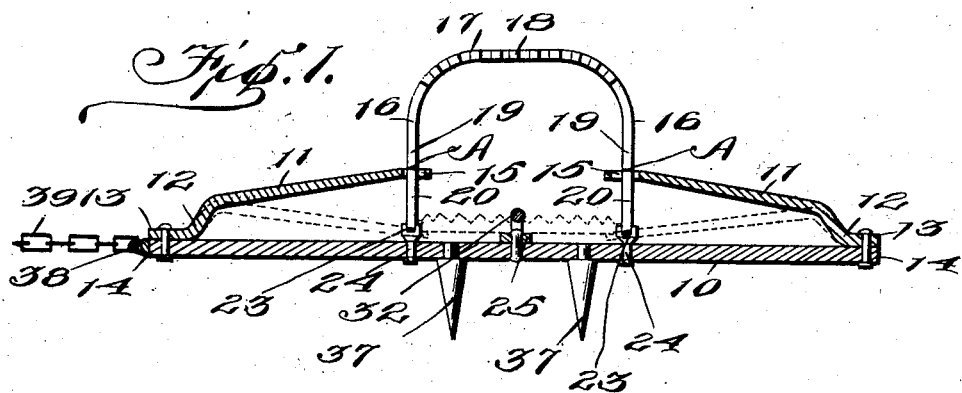
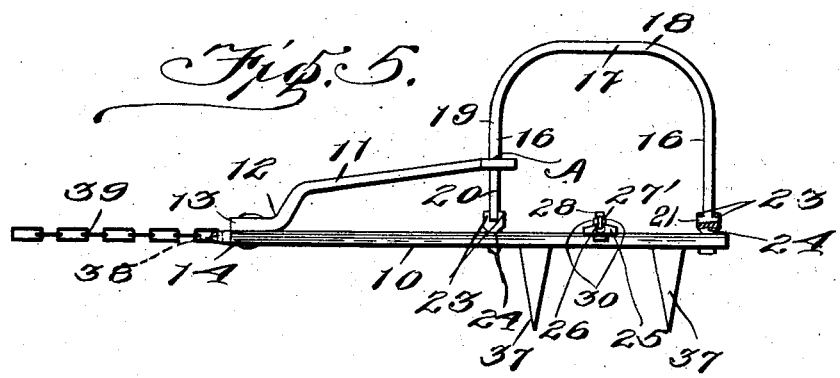
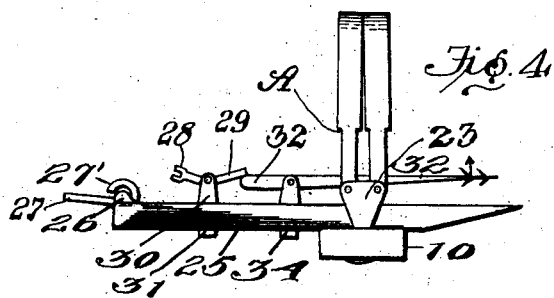
WITNESSES
INVENTOR
Harry Barber
by Woodward & Chandlee
Attorneys

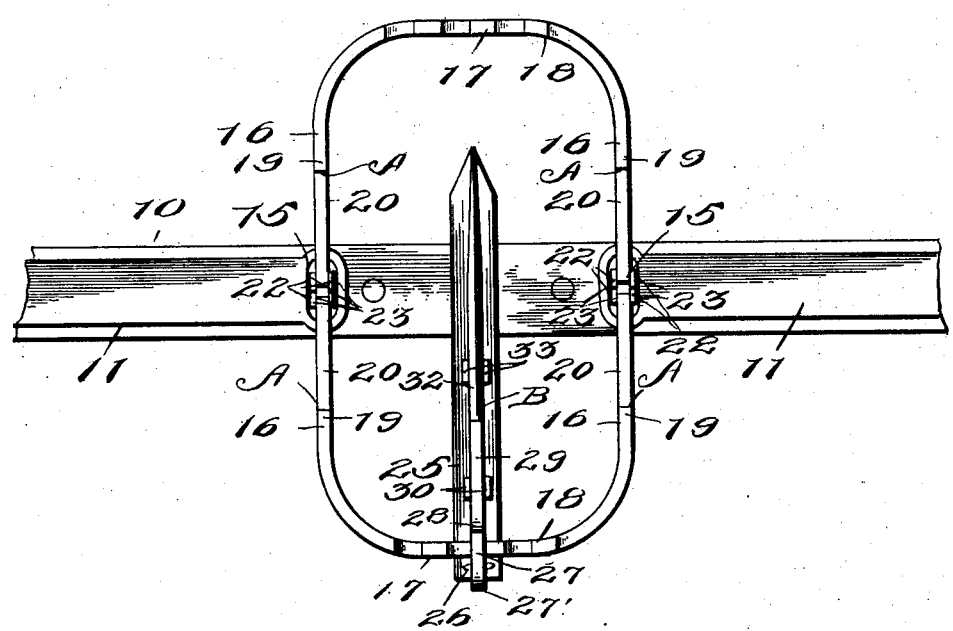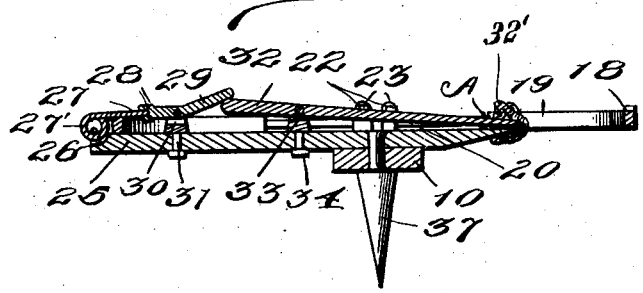

UNITED STATES PATENT OFFICE.

HARRY BARBER, OF OLMSTEAD, ILLINOIS.

TRAP.

No. 919,116.  Specification of Letters Patent.  Patented April 20, 1909.

Application filed January 24, 1908. Serial No. 412,483.

*To all whom it may concern:*

Be it known that I, HARRY BARBER, a citizen of the United States, residing at Olmstead, in the county of Pulaski and State of Illinois, have invented certain new and useful Improvements in Traps, of which the following is a specification.

This invention relates to traps, and particularly to metal jaw traps for catching fur bearing animals, and has for its object to provide such an article of durable and simple construction, and effective in operation.

Another object is to provide such an article having an especially sensitive releasing mechanism, which may be easily set and will consist of few and simple parts, so that it cannot easily become deranged.

Another object is to provide an article of the kind which may be manufactured at low cost.

Other objects and advantages will be apparent from the accompanying description, and it will be understood that changes in the specific structure shown and described may be made within the scope of the claims without departing from the spirit of the invention.

In the drawings forming a portion of this specification, and in which like characters of reference indicate similar parts in the several views, Figure 1 is a sectional view longitudinally of the trap in sprung position, the dotted lines indicating the position of the jaws when set, Fig. 2 is a top plan view of the trap, set, Fig. 3 is a sectional view laterally of the trap, showing it in set position, Fig. 4 is a cross sectional view of the trap with the outer spring 11 removed, Fig. 5 is a view of a modified form of the invention having but one operating spring.

Referring to the drawings, there is shown a trap comprising a base piece 10, bearing oppositely disposed operating springs 11 formed of tempered metal, and having their outer end portions 12 depressed to extend in a different but parallel plane with respect to the remaining portion, and secured to the opposite ends 14 of the base piece 10 as shown at 13. The opposite extremities of the springs 11 are provided with ovate perforations 15 extending laterally thereof, and are forced inwardly and downwardly and held against their upward stress by the engagement therethrough of arms 16 of jaws 17 now to be described. The jaws comprise two metal yokes having central engaging portions 18 from which extend laterally spaced arms 19, the end portions 20 of which are reduced in diameter from the point A to permit the sliding engagement thereover of the perforations 15 of the springs 11 until stopped by the thicker portion of the arms 19 the effect of which is to pinch the jaws 17 forcefully together. The ends of the arms 19 are provided with lateral pivot arms 21 extending oppositely therefrom, and engaged in spaced perforations 22 in ears 23 of bolts 24 secured to the base piece 10 directly below the perforations 15.

A trigger releasing mechanism B is shown located at the center of the base piece directly beneath the jaws 17, and comprises a horizontally extending short bar of metal 25 sharply pointed at its inner end and secured to the base piece 10 midway of the jaws 17. The outer end of the bar 25 is provided with a perforation 26. A latch piece 27 comprising a piece of wire curved at one end to provide an eye 27′ is pivoted to the outer end of the bar 25, the eye portion being engaged through the perforation 26. The inner end of the latch piece 27 is engaged between the lips 28 of a release member 29, pivoted between projecting fingers 30 of a bolt 31, secured to the bar 25. The release member extends inwardly and its inner end is engaged over the outer end of a bait trigger 32, comprising a short spike pivoted adjacent to its lower outer end between fingers 33 of a bolt 34 secured to the bar 25. The inner end of the spike is sharply pointed and disposed against the point of the bar 25 to receive in conjunction therewith a piece of meat or other suitable bait, the removal of which allows it to move away from the point of the bar, thus allowing the operation of the releasing means.

Two downwardly extending spikes 37 are secured to the base piece 10 and are arranged to be forced into the ground to retain the trap in operative position. A perforation 38 is formed in one end of the base piece 10 outwardly of one of the springs 11, in which is engaged a chain 39, secured by its opposite end to a stake 40 arranged to be driven into the earth to hold the trap against being tugged away by a captured animal.

The modified form of the invention shown in Fig. 5 is similar in construction to the structure just described, with the exception that but one operating spring is provided and the base piece 10 does not extend beyond the outer pivot point of the jaws 17.

What is claimed is:

1. A trap comprising a straight bar of metal, springs carried thereby and extending inwardly in spaced relation therewith, said springs having perforations at their inner ends and being held in such spaced relation under upward stress, jaws having laterally extending spaced arms slidably engaged downwardly through the perforations in the springs and pivoted upon the bar, said arms having attenuated end portions which are gradually thickened so that they will be forced together by sliding movement thereover of the perforations in the springs, a short bar pointed at one end and provided with a perforation at its opposite end secured upon the first named bar midway of the jaws, a latch piece comprising a piece of wire having its outer end curved to form an eye and engaged through the perforations in the short bar, said latch piece being arranged for engagement over one of the jaws when the trap is set, a pivoted releasing member having lips at one end arranged to engage with and hold the latch piece in operative position until operated, a pivoted trigger member having one end pointed and disposed adjacent to the point of the said short bar to coengage therewith through a piece of bait, said trigger member being engaged at its opposite end with the said releasing member to obstruct operation thereof when the bait is engaged upon said trigger, said trigger member being arranged to yield to movement of the releasing member when the bait is disengaged, downwardly extending ground engaging spikes carried by the said first named bar to retain the trap in operative position.

2. The combination with a trap of a stationary barb and a pivoted barb spaced therefrom and adapted for impaling coengagement through a portion of bait, said pivoted barb being connected with the trap to obstruct operation thereof, and tending normally to yield to such operation, and being adapted to be held against yielding movement by tensional resistance of bait engaged thereover and coengaged with said stationary barb.

In testimony whereof I affix my signature, in presence of two witnesses.

HARRY BARBER.

Witnesses:
  C. A. F. PETERS,
  JEROME TAYLOR.